June 25, 1963     A. F. WEBER     3,095,026
PNEUMATIC TIRE
Filed Aug. 7, 1959     2 Sheets-Sheet 1

United States Patent Office

3,095,026
Patented June 25, 1963

3,095,026
PNEUMATIC TIRE
Arthur Frederick Weber, Akron, Ohio, assignor to The Firestone Tire & Rubber Company, Akron, Ohio, a corporation of Ohio
Filed Aug. 7, 1959, Ser. No. 832,238
5 Claims. (Cl. 152—355)

This invention relates to pneumatic tires and more particularly to wire tires having a construction which provides a high degree of dimensional stability to the tread.

Essentially the invention comprises a tire construction in which a high degree of tread stability is provided by two tread plies of wire fabric, with the wire cables of one ply extending at equal and opposite angles to those of the other ply, in combination with a third tread ply of fiber-reinforced rubber in which the majority of the reinforcing fibers are oriented to lie in a direction parallel to each other and at an angle to the cables of the two wire tread plies.

These three tread plies, the two wire plies and the fiber-reinforced ply, cooperate to produce a tread portion which has a high degree of dimensional stability holding to a minimum the scuffing and abrasive wear which tends to take place to a marked degree in the operation of conventional tires. As a result, the tire of the present invention has a long tread life and delivers low cost mileage.

The ply of oriented fibers, in addition to cooperating with the two tread plies to produce the desired dimensional stability in the tread also cooperates with the body of the tire to reinforce it and to impart to the tire good handling and steering characteristics which otherwise tends to be lacking in such tires.

The tires embodying the invention are easy and economical to manufacture, they require no special manufacturing methods and they can be readily shaped and vulcanized.

These advantages and other objects and advantages of the invention will be more readily apparent from a description of several forms of the invention, reference being had to the accompanying drawings in which.

Figure 2:
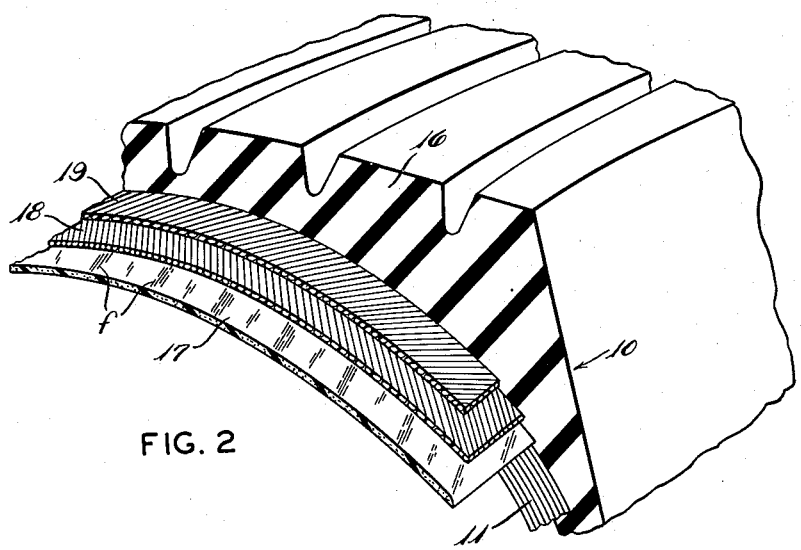
FIGURE 2 is a fragmentary view, partly in section, showing in more detail, and on an enlarged scale, the construction of the tire of FIGURE 1.
Figure 4:
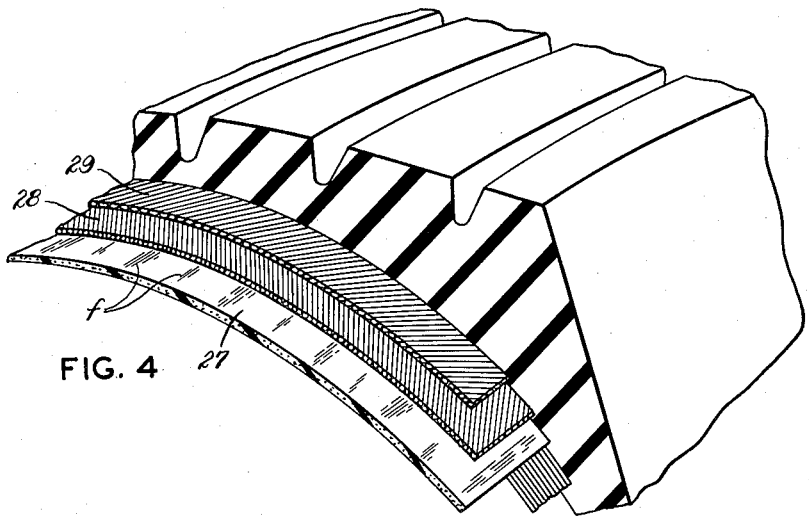
Figure 5:
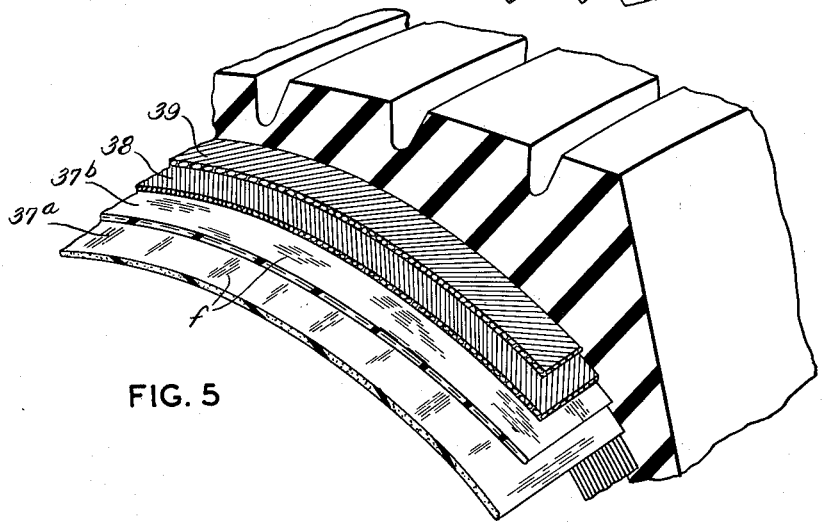

FIGURE 4 is a view similar to FIGURE 2 showing a modification of the invention in which the direction of the oriented fibers in the one tread ply extends transversely to the direction of the wire cables in the body ply; and FIGURE 5 is a view similar to FIGURE 2 showing a modification embodying two oriented fiber tread plies in which the fibers of one such tread ply extend oppositely to those of the other tread ply.

The invention is described with reference to FIGURE 1 as embodied in a 10.00—20 highway truck tire, but it will be apparent that it will be useful in other types of tires both for highway and off-the-road use and in tires for other vehicles and other conditions and types of service. Such a tire, which is indicated generally at 10, comprises a single body ply 11 of wire cables which extend at 0° to the rolling axis of the tire, the ends of which are wrapped about and anchored to inextensible cores to form the beads indicated at 12 and 13, respectively. Sidewalls 14 and 15 and a tread portion 16 complete the tire.

A high degree of dimensional stability is imparted to the tread portion 16 by three tread plies indicated, respectively, at 17, 18 and 19, which are substantially the same width as the tread portion. The innermost tread ply 17 lies immediately adjacent the crown portion of body ply 11 and consists of rubber reinforced with oriented fibers f which will be described in more detail later. The outer plies 18 and 19 are wire fabric tread plies in which the wire cables of each ply are parallel to each other and extend at angles within a range of 60° to 80°, and preferably at an angle of about 70°, to the rolling axis of the tire. The cables of ply 18 extend oppositely to and cross those of ply 19.

Figure 3:
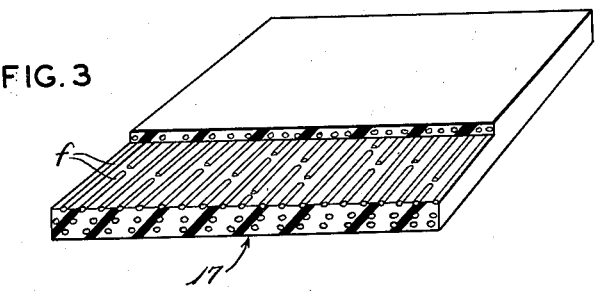
FIGURE 3 is a somewhat diagrammatic view showing on an enlarged scale a portion of the oriented fiber material which comprises one of the tread plies of the tire of FIGURES 1 and 2.

In this particular example, the tread ply 17 is substantially the same gauge as the wire plies 18 and 19, the gauge being about 0.080 inch thick and the rubber tread ply 17 has a modulus of about 1300 p.s.i. at 20% elongation. Obviously the gauge of tread ply 17 and the modulus and other characteristics of the rubber compound will vary depending upon the tire and the service to which it will be subjected. The ply 17 is reinforced by the fibers f, which in this particular instance, are of nylon, the majority of which are oriented to lie parallel to each other and to extend at an angle within a range of 0°–30° to the rolling axis of the tire. In this example about 90% and more of the nylon fibers are oriented to lie parallel to each other in the same direction, see FIGURE 3, while the remainder of the fibers are somewhat less oriented. The required degree of orientation is conveniently produced by conventional milling and calendering operations. The nylon fibers range in denier from about 1½ to 6 and range in length from about 1 to 1¼ inches and consist of about 2–5% by weight, of the tread ply material.

Fibers other than nylon may be used to advantage, for example fibers such as cotton, rayon, Dacron, glass fibers, Saran, polypropylene, polyethylene and steel or other suitable metal fibers may also be used. For example, excellent results will be obtained if the rubber ply 17 is reinforced with steel fibers in the order of about 0.0059 inch in gauge and about ⅞ inch in length.

Figure 1:
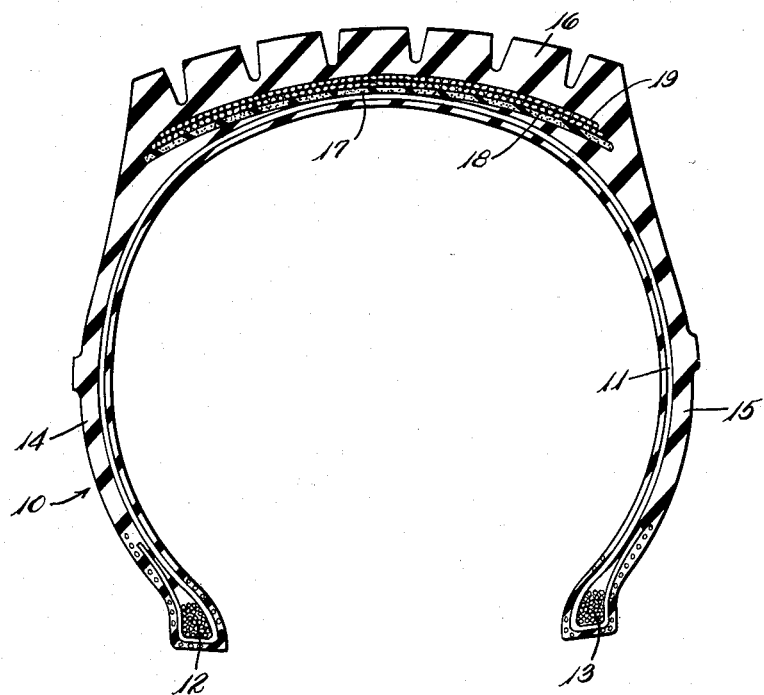
FIGURE 1 is a sectional view, taken in a radial plane, of a tire embodying the invention.

In another form of the invention, as shown in FIGURE 4, the innermost tread ply 27 is reinforced with fibers f like the ply 17 of the tire of FIGURE 1, while the wire tread plies 28 and 29 are identical to and correspond respectively to plies 18 and 19. However, in ply 27, the direction of orientation of the nylon fiber extends at angles in the range of 70° to 90° to the rolling axis of the tire. In such case, the fibers of the ply will reinforce the body ply in the circumferential direction and materially reduce any tendency of the body ply to crack between the body cables in the crown of the tire.

In the modification of the invention illustrated in FIGURE 5, two tread plies, 37a and 37b, each reinforced with oriented nylon fibers f are used in place of the ply 17 of FIGURE 1 while the tread plies 38 and 39 are identical to and correspond, respectively, to plies 18 and 19.

The plies 37a and 37b are assembled in the tire in such a manner that the oriented fibers f in the ply 37a extend at an angle of about 90° to the rolling axis of the tire while the oriented fibers f of ply 37b extend at an angle of about 0° to the axis. The direction of fibers in plies 37a and 37b thus cross each other at approximately right angles. These two fiber-reinforced plies cooperate with outer plies 38 and 39 to give the desired dimensional stability to the tread and the two plies together cooperate to strengthen and support the body ply of the tire circumferentially against cracking.

While the several forms of the invention have been described by way of example in connection with a tire comprising a wire cable body ply, with the cables extending at an angle of 0°, the invention can be practiced with tires of differing body constructions and characteristics. For example, the body ply need not be of wire cable, it can be of any suitable textile fabric. One or more body plies may be used, if desired, and the bias angle of the wire cables or textile cords of the body plies may extend not only at 0° but also at any of the other conventional bias angles.

Also in the several forms of the invention just described, the fiber-reinforced tread plies are described as being immediately adjacent to and outside the outermost body ply. It will be apparent that such tread plies may be located, with advantage, either between the two wire tread plies, or it may be located outside these two plies immediately adjacent the tread of the tire. In some cases, the fiber-reinforced ply may be located inside of the body ply or plies or between the body plies if more than one body ply is present.

What is claimed is:

1. A pneumatic tire having a radial cord body and a tread ply assembly comprising three individual tread plies arranged radially inwardly of the tread surface of said tire, two of said individual tread plies of said assembly comprising rubbery material reinforced with parallel cords of substantially non-extensible material extending continuous from edge to edge of said tread plies at acute angles to the rolling axis of said tire and with the cords of one of said two tread plies extending oppositely to and crossing the cords of said other ply, the third tread ply constituting the exterior layer of said tread ply assembly and comprising rubbery material reinforced with discontinuous, individual, discrete oriented fibers, the direction of orientation extending at an angle to the cords of each of said other two tread plies, said tread ply assembly providing stability to said radial cord tire body.

2. A pneumatic tire as in claim 1, in which said oriented fibers comprise metallic elements.

3. A pneumatic tire as in claim 1, in which said oriented fibers comprise textile elements.

4. A pneumatic tire as in claim 1, in which said oriented fibers comprise mineral elements.

5. A pneumatic tire comprising a radial cord body and a tread ply assembly comprising three individual tread plies interposed between the body ply and the tread surface of said tire, the two radially outer of said tread plies of said assembly comprising rubbery material reinforced with parallel wire cables extending continuous from edge to edge of said tread plies at angles of about 60°–80° to the rolling axis of said tire, and with the wire cables of one of said outer plies extending oppositely to and crossing the wire cables of the other ply, the third tread ply constituting the exterior layer of said tread ply assembly and comprising rubbery material reinforced with discontinuous, individual, discrete oriented fibers, the direction of orientation extending at an angle to the wire cables of each of said two tread plies, said tread ply assembly providing stability to said radial cord tire body.

References Cited in the file of this patent

UNITED STATES PATENTS

| | | |
|---|---|---|
| 793,181 | Crane | June 27, 1905 |
| 1,214,670 | Geer | Feb. 6, 1917 |
| 1,460,599 | Nicholson | July 3, 1923 |
| 1,714,995 | Wescott | May 28, 1929 |
| 2,056,012 | Madge et al. | Sept. 29, 1936 |
| 2,493,614 | Bourdon | Jan. 3, 1950 |
| 3,018,814 | Saint-Paul | Jan. 30, 1962 |

FOREIGN PATENTS

| | | |
|---|---|---|
| 1,145,600 | France | May 6, 1957 |